United States Patent [19]

Piele

[11] Patent Number: 4,658,256
[45] Date of Patent: Apr. 14, 1987

[54] COMBINED MONOPULSE COMPARATOR AND ADAPTIVE NOISE CANCELLER FOR ANTENNAS

[75] Inventor: Gerald H. Piele, Salt Lake City, Utah
[73] Assignee: Sperry Corporation, Blue Bell, Pa.
[21] Appl. No.: 775,381
[22] Filed: Sep. 12, 1985
[51] Int. Cl.$^4$ .......................... G01S 3/16; G01S 5/02
[52] U.S. Cl. .................................... 342/383; 342/427
[58] Field of Search ............... 343/383, 384, 427, 378, 343/379, 16 M

[56] References Cited

U.S. PATENT DOCUMENTS 4,516,126  5/1985  Masak et al. ....................... 343/383
4,549,183  10/1985  Farina ............................... 343/16 M Primary Examiner—Theodore M. Blum
Assistant Examiner—Gregory C. Issing
Attorney, Agent, or Firm—G. Donald Weber, Jr.; Glenn W. Bowen

[57] ABSTRACT

This invention is directed to a modified monopulse comparator which includes two sum and difference hybrid junctions. The first hybrid junction produces a signal-free sample of any interference which is received by the datalink receiving antenna. The second hybrid junction is a standard monopulse comparator driven by amplified and filtered signals from the A and B antenna feeds after subtraction of the properly scaled and phased interference sample.

14 Claims, 2 Drawing Figures

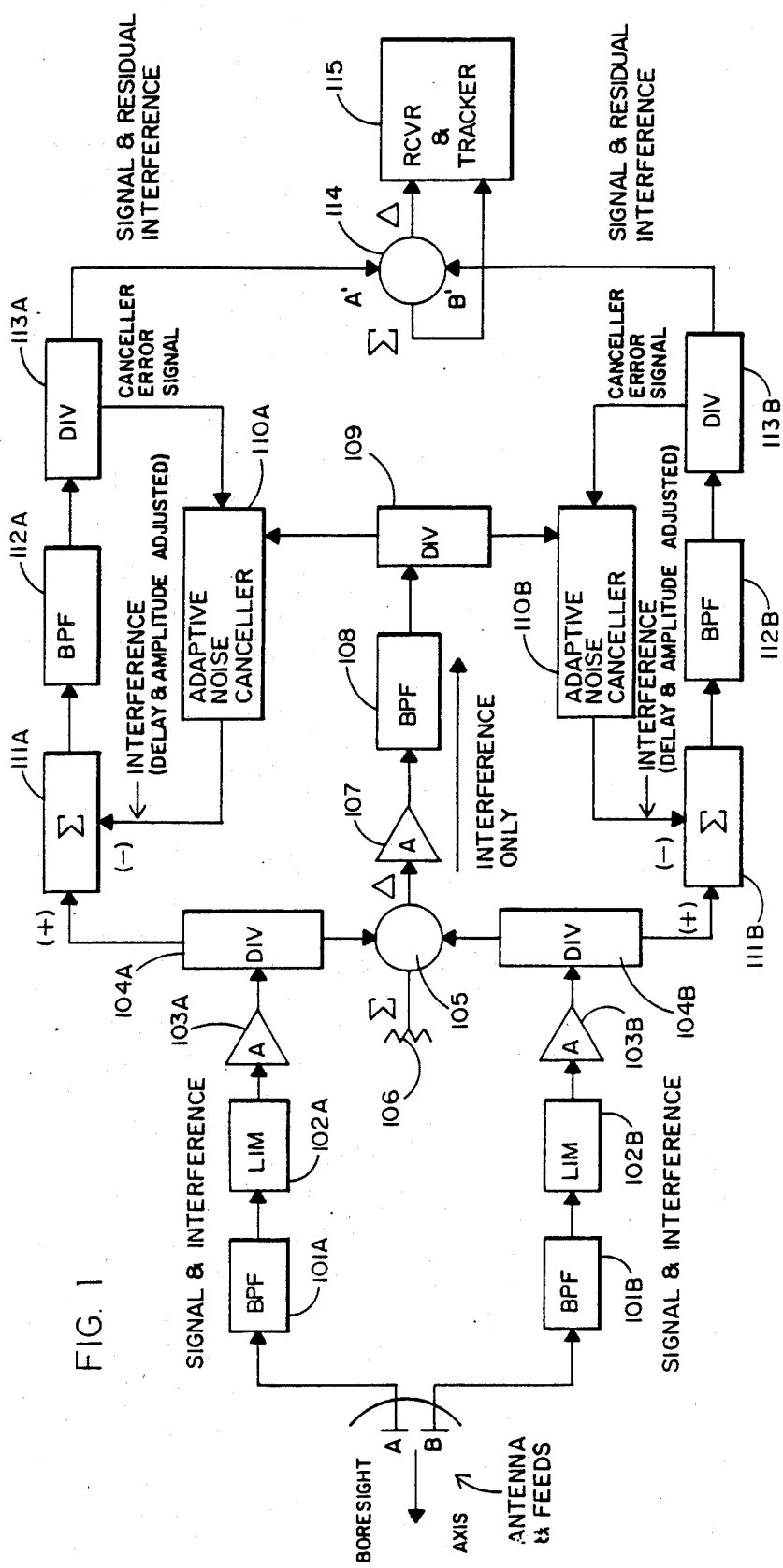

COMBINED MONOPULSE COMPARATOR AND ADAPTIVE NOISE CANCELLER FOR ANTENNAS

BACKGROUND

1. Field of The Invention

This invention is directed to antenna systems in general, and to systems which are used with an automatic tracking antenna, in order to reduce or improve the signal-to-interference ratio, in particular.

2. Prior Art

There are many known uses for datalinks between one or more users of a particular system. The datalink is used to provide a transfer of information from a source to a receiver. The datalink may utilize microwave or optical wavelength electromagnetic waves. It is usual to provide an antenna at both the source and the receiver ends of the datalink. In this case, the antennas can act as radiators and/or receivers.

In a usual application, the antennas are arranged to point at each other and to produce directive reception and transmission of electromagnetic energy along a path between the respective units. If one or both antennas are mounted on moving vehicles, it is necessary to use some sort of automatic angle tracking or antenna pointing system to keep the antennas continuously pointed in the proper direction.

Unfortunately, in certain types of datalinks, especially those between airborne and ground units, unwanted interference emanating from various radars or different datalinks can often be encountered and picked up by the datalink receiving antenna. Moreover, because of the movement of the airborne vehicle relative to the ground receiving antenna station, the angle tracking must be quite accurate in order to avoid loss of signal strength due to antenna mispointing. Because of the interference which can be picked up, the antenna angle tracking can sometimes become noisy or the receiving antenna may lose tracking "lock" wherein the datalink is severed and the desired signal is lost.

In addition, in the airborne/ground station operation, it can frequently occur that a separate airborne vehicle (or aircraft) can fly into or through the area of the down-link arrangement. This second aircraft can, and usually does, include its own radar system or, possibly, its own down-link system. In any event, it frequently occurs that the ground station (the basic tracking station) will detect the second radar system and begin to track the secondary aircraft. Through this action, the down-link can be broken and lost. This situation can develop even though the secondary aircraft may be, in fact, a "friendly" aircraft. In some situations, such as a warfare situation, or a commercial operation comprising numerous aircraft in the same general area, the loss of the down-link contact can be very important and detrimental.

SUMMARY OF THE INSTANT INVENTION

This invention is directed to a monopulse comparator which includes adaptive noise cancellers for generating the angle track error signals which drive the antenna angle tracking servos. In particular, two sum and difference hybrid devices are used in order to provide the modified monopulse comparator.

A first microwave hybrid junction device is utilized to obtain a signal-free sample of the interference signal. A second microwave hybrid junction device is a standard comparator which is used in the usual fashion.

The antenna is arranged with two feeds in each tracking plane. (Two feeds for azimuth tracking and two feeds for elevation tracking). The feeds are offset from the boresight axis in the usual manner for amplitude monopulse, so that two offset receiving antenna patterns are produced, with the mainlobes squinted symmetrically away from the boresight direction, one pattern for each feed. The signals from the two feeds (A and B) in FIG. 1, are bandpass filtered, amplified, and a sample of each is fed into the first hybrid. the difference output from the first hybrid is taken as the input signal into the adaptive noise canceller. If the original signal was on the boresight axis of the antenna, and if the gain and phase characteristics of the amplifiers filters and limiters in the A and B channels are identical, the difference output of the first hybrid will be a null. The desired datalink signal would, ideally, be right on the boresight axis of the antenna during tracking and would therefore produce a null output from the first hybrid. The interfering signal, however, would ordinarily enter the antenna pattern from an outside edge and would, therefore, not initially be on the boresight axis. In this case, the interference signal would be received more strongly on one of the antenna feeds then on the other. Thus, the A and B channel signals would not be equal and would not null or cancel each other on the difference output of the hybrid. Consequently, there would ordinarily be a signal-free sample of the interference waveform present on the difference port of the first hybrid.

The adaptive noise cancellers are, basically, conventional circuits which are used and operate to subtract out any components of the received signal which correlate with the interference sample. Thus, the signal components which are subtracted out will be the interference signal rather than the desired datalink signal. This occurs inasmuch as there is very little of the desired signal waveform present in the interference signal when it is obtained in the manner described.

The interference-reduced signals supplied by the output channels of the adaptive filters are then supplied to the conventional monopulse comparator which is operative to supply the interference-reduced signal to the receiver and tracker antenna systems. This system is believed to be equally effective on either phase or amplitude monopulse systems.

BRIEF DESCRIPTION OF THE DRAWINGS

FIG. 1 is a block diagram of the system of the instant invention.

FIG. 2 is a representation of the signal pattern produced by the antenna used with this invention.

DESCRIPTION OF A PREFERRED EMBODIMENT

Referring now to FIGS. 1 and 2, concurrently, there is shown a typical antenna 100 which has a pair of offset antenna feeds A and B. These feeds are slightly offset from the center of the antenna in order to provide the appropriate pattern such as is shown in FIG. 2. That is, antenna feed A produces the pattern lobe A while antenna feed B produces the lobe B in the pattern shown in FIG. 2. It is noted that the boresight axis of the antenna 100 is substantially centrally or axially located relative to the antenna. Likewise, the boresight axis of the pattern is centrally located within the signal lobes which are generated by the antenna feeds.

Each of the feeds A and B of the antenna are connected to respective signal lines. Each of these signal lines includes a bandpass filter 101A or 101B, a limiting amplifier or other limiting network 102A and 102B and an amplifier circuit 103A or 103B. The amplifiers 103A and 103B are low noise amplifiers which are intended to amplify the signals supplied thereto and to establish the system noise figure. The limiters 102A and 102B are utilized primarily for protecting the associated amplifiers by limiting the amplitude of the signal supplied thereto. The bandpass filters 101A and 101B are utilized to control the passage of signals therethrough which are within the bandwidth of interest.

Each of the amplifiers 103A and 103B is connected to a respective power divider network 104A or 104B. One output of each of the power divider networks is supplied to an input of a microwave hybrid comparator circuit 105. In the instant embodiment, one of the outputs, i.e. the sum port output ($\Sigma$), of the hybrid comparator 105 is terminated in a suitable termination 106 so that signal reflections are inhibited. The other output, i.e. the difference port output ($\Delta$), of the comparator 105 is supplied to the input of amplifier 107 which is of similar construction to the amplifiers in the signal and interference lines, previously noted.

The output of amplifier 107 is supplied to a bandpass filter 108 which restricts the frequency of signals passed therethrough. The output of BPF 108 is supplied to the input of a power divider 109. This divider supplies a portion of the interference signal sample to the inputs of separate adaptive noise cancellers 110A and 110B.

The dividers 104A and 104B mentioned supra also produce further signals which are supplied to one input of the summer circuits 111A and 111B, respectively. Summing circuits 111A and 111B are also microwave hybrids such as a "magic tee" or "rat race" hybrid. The outputs of the summers are supplied to bandpass filter circuits 112A and 112B, respectively, and thence to further divider circuits 113A and 113B. One output of the divider circuit 113A is connected to an input to the adaptive noise canceller 110A. This connection supplies an "error signal" to the ANC 110A. Another output of the divider 113A is connected to supply an input signal A' to the monopulse comparator 114. The phase and amplitude adjusted interference sample output of the adaptive noise canceller 110A is supplied as an input signal to the summer circuit 111A noted above, where it is subtracted from the input supplied from divider 104A.

In similar fashion, one output of summer circuit 111B (signal B') is supplied to another input of comparator 114. A further output of divider 111B (error signal) is supplied to an input of ANC 110B which then supplies an out-of-phase sample of the interference signal to summer circuit 111B, where it is subtracted from the signal supplied from divider 104B.

It is seen that each of the circuit channels is, effectively, balanced so that a pair of parallel paths of substantially identical operating characteristics is provided. Each of these paths provides a signal to the second monopulse comparator 114. In this case, the sum ($\Sigma$) and difference ($\Delta$) output signals are supplied to an output or utility device such as the receiver and tracker portion 115 of the antenna system.

In operation, a signal is detected at the antenna 100. So long as the antenna is tracking the appropriate signal and the datalink is in place, the signal is received along the boresight axis and is received equally by the A and B antenna feeds. Assuming that the signals are balanced, the signals A and B are passed through the respective signal lines to the respective dividers 104A and 104B and the difference between the signals is taken at the first comparator 105. Inasmuch as the signals are balanced, the difference signal is 0. Thus a 0 or null signal is applied to the amplifier 107, the bandpass filter 108 and the divider 109, and, thence, to the adaptive noise cancellers 110A and 110B. Likewise, the balanced signals are supplied by the dividers 104A and 104B to the summing networks 111A and 111B, the bandpass filters 112A and 112B and the dividers 113A and 113B which are associated with the adaptive noise cancellers. Clearly, so long as the signal received at antenna 100 is balanced, the operation of the respective circuits paths is balanced so that the A' and B' signals supplied to comparator 114 are balanced. In this case the difference signal $\Delta$ is 0 while the sum signal $\Sigma$ is the total of the input signals A and B.

Conversely, if an interference signal is supplied through any means such as jamming, sending an improper signal into the downlink receiver, or the like, the signals A and B will become unbalanced. This unbalance may be manifested by the A signal being larger than the B signal, the reverse condition, or one signal being larger for a time and then the situation reversed as a separate source passes through the beamwidth of the antenna.

Nevertheless, it is seen that in an unbalance situation, both the desired signal and the undesired or interference signal are supplied to the respective signal paths associated with antenna feeds A and B. In this case, however, the different signals are divided at dividers 104A and 104B, as before, and applied to the first hybrid comparator 105. In this instance, the difference signal for the interference is not 0. This difference signal is supplied through the network comprising the amplifier 107, the bandpass filter 108 and the divider 109 to the respective adaptive noise cancellers 110A and 110B. It is seen that the adaptive noise cancellers will then be adjusted by having the taps or weights and phase shift thereof modified as a result of the application of this difference signal. This signal is then operative to cause the adaptive noise canceller to supply its own interference signal representation to the summing networks 111A and 111B. The inputs to the adaptive noise canceller from divider 113A and divider 109, for example, are multiplied together or "correlated" in the input circuitry of the adaptive noise canceller. If any component of the signal from divider 113A matches or correlates with any component of the interference sample supplied from divider 109, the adaptive filter modifies the phase and amplitude of the interference sample supplied to hybrid summing network 111A until it is equal in amplitude and opposite in phase to the interference signal applied to summing network 111A by divider 104A. The adaptive noise canceller is like a closed loop servo which drives to null out any signal components at divider 113A which correlate with the interference sample applied to adaptive noise canceller 110A by divider 109. The same operation happens in the other signal channel.

When the signals (with the interference signal subtracted out) have passed through the divider networks 113A and 113B to the second comparator 114, the output signals, both sum and difference, are supplied to the receiver and tracker device 115 to cause a change in the position thereof. That is, this signal is used to drive the motor of the tracking antenna to continuously correct (i.e. reduce) the antenna angular tracking error in the usual way common to automatic angle tracking antennas. It may be considered that the first comparator 105 and associated adaptive noise cancellers function as a "clean-up" device for removing the interference signal from the input to the circuit.

Thus, there is shown and described a circuit which improves the signal-to-interference ratio and permits more accurate tracking of a datalink signal. The system permits the receiver and tracker systems to track the correct signal and reject most of the interference. The system shown and described includes a plurality of monopulse comparators for affecting this signal modification. Other circuits have been shown to assist in this operation. The circuits include bandpass filters, limiters, amplifiers, dividers and summers. Obviously, modifications and changes to the specific system structure can be conceived by those skilled in the art. However, any such modifications which fall within the purview of the description are intended to be included therein as well. The scope of this application is not limited by the specific embodiment which is described above. Rather, the scope of this invention is limited only by the claims appended hereto.

I claim:

1. A monopulse comparator system comprising,
   antenna means comprising feed means for providing two input signals which are each representative of a signal pattern relative to a receiving axis of said antenna means which is symmetrically offset with respect to the signal pattern associated with the other of said input signals,
   first and second signal channels connected in parallel, each coupled to receive one of said input signals
   first comparator means coupled to both of said first and second signal channels to produce a difference signal which is a function of the difference between said input signals,
   first and second adaptive noise canceller means connected to receive said difference signal,
   first and second signal modifier means connected to said first and second adaptive noise canceller means, respectively, to selectively alter the status of the respective adaptive noise canceller,
   said first and second signal modifier means being coupled to supply modified signals which are modified by the respective adaptive noise canceller means, and
   second comparator means connected to receive signals from both of said first and second signal modifier means and to produce both a sum and a second difference signal which is a function of the sum and the difference between said modified signals.
2. The circuit recited in claim 1 including,
   output means connected to said second comparator means to receive said sum and said second difference signals.
3. The circuit recited in claim 1 wherein,
   each of said first and second comparator means comprises a hybrid monopulse comparator means.
4. The circuit recited in claim 1 including,
   attenuator means connected to said first comparator means such that the sum output terminal thereof is terminated and signal reflections are inhibited.
5. The circuit recited in claim 1 wherein,
   each of said first and second signal channels includes signal filter means, signal limiting means and amplifier means connected in series.
6. The circuit recited in claim 1 including,
   first and second power divider means connected to receive signals from said first and second signal channels respectively, and to supply signals to said first comparator means and to said first and second signal modifier channels means respectively.
7. The circuit recited in claim 1 wherein,
   each of said first and second signal modifier means includes a summer means, a filter means and a signal divider means connected in series with each other and with the respective first and second adaptive noise canceller means in a closed loop.
8. The circuit recited in claim 7 wherein,
   said first and second signal modifier channels means are connected between the input and the output of the respective adaptive noise canceller networks means.
9. The circuit recited in claim 1 including,
   interference signal channel means connected between said first comparator means and each of said first and second adaptive noise canceller networks means.
10. The circuit recited in claim 9 wherein,
    said interference signal channel means includes amplifier means, filter means and divider means connected in series and adapted to supply said difference signal from said first comparator means to each of said first and second adaptive noise canceller networks means via said divider means.
11. The circuit recited in claim 1 including,
    input means for supplying said input signals to said first and second signal channels.
12. The circuit recited in claim 11 wherein, said antenna means comprises at least two feed means.
13. The circuit recited in claim 3 wherein,
    each of said first and second comparator means comprises a microwave hybrid junction means.
14. The circuit recited in claim 1 wherein,
    each of said adaptive noise canceller means comprise adaptive filter means.

* * * * *